United States Patent
Jang et al.

(10) Patent No.: US 7,999,991 B2
(45) Date of Patent: Aug. 16, 2011

(54) ELECTRODE COMPRISING LITHIUM NICKEL OXIDE LAYER, METHOD FOR PREPARING THE SAME, AND ELECTROCHROMIC DEVICE COMPRISING THE SAME

(75) Inventors: Ki-Seok Jang, Daegu (KR); Hyun-Woo Shin, Gwacheon-si (KR); Jae-Hong Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/448,909

(22) PCT Filed: Jan. 22, 2008

(86) PCT No.: PCT/KR2008/000400
§ 371 (c)(1),
(2), (4) Date: Jul. 15, 2009

(87) PCT Pub. No.: WO2008/091099
PCT Pub. Date: Jul. 31, 2008

(65) Prior Publication Data
US 2010/0014145 A1    Jan. 21, 2010

(30) Foreign Application Priority Data
Jan. 22, 2007 (KR) .................. 10-2007-0006435

(51) Int. Cl.
*G02F 1/153* (2006.01)
(52) U.S. Cl. ....................................... 359/269; 349/105
(58) Field of Classification Search .................. 359/269
See application file for complete search history.

(56) References Cited

U.S. PATENT DOCUMENTS

| | | | |
|---|---|---|---|
| 5,307,201 A | 4/1994 | Passerini et al. | |
| 7,564,611 B2 * | 7/2009 | Jang et al. | 359/265 |

FOREIGN PATENT DOCUMENTS

| | | | |
|---|---|---|---|
| JP | 56-033627 A | | 4/1981 |
| JP | 04-188114 A | | 7/1992 |
| KR | 10-0196009 B1 | | 6/1999 |
| KR | 10-2003-0040653 | | 5/2003 |
| KR | 10-2003-0081494 | | 10/2003 |
| KR | 10-2007-0074502 | | 7/2007 |
| KR | 10-0786973 | | 7/2007 |

* cited by examiner

*Primary Examiner* — Jessica T Stultz
(74) *Attorney, Agent, or Firm* — McKenna Long & Aldridge LLP (57) ABSTRACT

Disclosed is a method of preparing an electrode, which can lead to uniform electrochromism of a lithium nickel oxide layer by applying a voltage in all directions of the electrode during a formatting process, an electrode prepared by the same, and an electrochromic device including the electrode.

21 Claims, 4 Drawing Sheets

Related Art ical cell.
ELECTRODE COMPRISING LITHIUM NICKEL OXIDE LAYER, METHOD FOR PREPARING THE SAME, AND ELECTROCHROMIC DEVICE COMPRISING THE SAME This application claims the benefit of PCT/KR2008/000400 filed on Jan. 22, 2008, and Korean Patent Application No. 10-2007-0006435 filed on Jan. 22, 2007, both of which are hereby incorporated herein by reference for all purposes in their entirety.

TECHNICAL FIELD

The present invention relates to a method of preparing an electrode, which can lead to uniform electrochromism of a lithium nickel oxide layer by applying a voltage in all directions of the electrode during a formatting process.

BACKGROUND ART

In general, electrochromism refers to a phenomenon where a color is changed by oxidation/reduction reactions according to the potential of the electric field applied from the outside. Electrochromic materials are classified into organic material and inorganic material. The organic material includes viologen, anthraquinone, phenothiazine, polyaniline, polypyrrole, polythiophene, etc. The inorganic material includes a reductive electrochromic material such as $WO_3$, $MoO_3$, $CeO_2$, $MnO_2$, $Nb_2O_5$, etc., and an oxidative electrochromic material such as $Ir(OH)_x$, NiO, $LiNiO_2$, etc.

In the case of the inorganic electrochromic material used for most oxidative electrodes, in preparing an electrochromic material, a sol-gel reaction is performed only at temperatures of 400° C. or more. In addition, there is a problem in that a device requires a high operating voltage, a long coloring/decoloring response time is required, and optical properties are not enough. On the other hand, lithium nickel oxide ($Li_xNi_{1-y}O$), which is an electrochromic material used for an oxidative electrode, has advantages including high light transmittance, excellent electrochromic properties, low voltage driving ability, a high response speed, etc. Therefore, research on such lithium nickel oxide has been recently performed. Especially, on the structure of lithium nickel oxide ($Li_xNi_{1-y}O$) prepared by a sol-gel method, a mechanism on intercalation and deintercalation of $Li^+$, and the change in the structure, much research has already been conducted.

Lithium nickel oxide ($Li_xNi_{1-y}O$) is generally prepared by a sol-gel method, a sputtering method, a pulsed laser deposition method, etc. However, when the lithium nickel oxide ($Li_xNi_{1-y}O$) formed on a conductive substrate is used as an electrochromic material, some problems exist.

A lithium nickel oxide ($Li_xNi_{1-y}O$) electrode, in which a lithium nickel oxide layer is deposited by a sputtering method, is in an unstable state where both $Ni^{2+}$ and $Ni^{3+}$ exist in the structure. Accordingly, in an electrochromic device using the lithium nickel oxide ($Li_xNi_{1-y}O$) there are some serious problems in that the electrochromic range is narrowed due to incomplete oxidation/reduction of lithium nickel oxide ($Li_xNi_{1-y}O$) and especially, the device does not become colorless and transparent due to incomplete reduction of lithium nickel oxide. Therefore, when an electrochromic device is obtained by cohering an oxidative electrode including a lithium nickel oxide ($Li_xNi_{1-y}O$) layer with a reductive electrode, lithium nickel oxide ($Li_xNi_{1-y}O$) is required to be completely decolored by repeatedly applying oxidation/reduction voltages to the electrochromic device.

In the case of a lithium nickel oxide ($Li_xNi_{1-y}O$) layer having a thickness of about 150 nm or more, lithium nickel oxide ($Li_xNi_{1-y}O$) is decolored by repeatedly applying oxidation/reduction voltages several hundred times. However, herein, there is a problem in that an electrochromic device is incompletely decolored.

Also, a lithium nickel oxide ($Li_xNi_{1-y}O$) material, which is deposited by a sputtering method, exhibits poor adhesion onto the surface of FTO(Fluorine-doped Tin Oxide) glass. Accordingly, when oxidation/reduction is repeatedly performed on an electrochromic device, an electrode material is changed into $NiO_x$ or NiOOH, and thus may be stripped from an electrode surface or cause bubbles within electrolyte.

BRIEF DESCRIPTION OF THE INDICATION

101: electrochemical cell, 102: electrolyte, 103: counter electrode, 104: glass substrate, 105: ITO thin film, 106: lithium nickel oxide thin film, 107 voltage applying means, 108: power

201: ITO coating glass substrate, 202: lithium nickel oxide thin film, 203: voltage applying means(clip),

301: ITO coating glass substrate, 302: lithium nickel oxide thin film, 303: voltage applying means(jig),

401: electrochemical cell, 402: electrolyte, 403: counter electrode, 404: glass substrate, 405: ITO thin film, 406: lithium nickel oxide thin film, 407: voltage applying means (clip), 408: power,

501: electrochemical cell, 502: electrolyte, 503: counter electrode, 504: glass substrate, 505: ITO thin film, 506: lithium nickel oxide thin film, 507: voltage applying means (clip), 508: power

DISCLOSURE OF THE INVENTION

Nickel ions within lithium nickel oxide may have a single oxidation number through an electrochemical treatment of an electrode including a lithium nickel oxide ($Li_xNi_{1-y}O$) layer before the obtaining an electrochromic device, and then, it is possible to obtain an electrode having a wide electrochromic range.

However, in the electrochemical treatment, there may be a difference in the rates of the electrochemical treatment, according to the thickness of lithium nickel oxide, the temperature of electrolyte, an applied voltage, and the way of applying a voltage to a electrode. Accordingly, an electrode having uneven electrochromic properties or low durability may be obtained.

Accordingly, in the present invention, in an electrochemical treatment for allowing nickel within lithium nickel oxide to have a single oxidation number before obtaining an electrochromic device, a voltage is applied in all directions along the circumference of an electrode, and/or a working electrode and a counter electrode are horizontally disposed above a ground surface in an electrochemical cell including electrolyte. Therefore, electrochromism may be uniformly performed on the entire surface of the electrode through a uniform electrochemical treatment on the outer circumference of the electrode.

A According to an aspect of the present invention, there is provided a method of preparing an electrode containing lithium nickel oxide, in which nickel has a single oxidation number, the method comprising the steps of: a) preparing an electrode including a lithium nickel oxide ($Li_xNi_{1-y}O$, herein, 0.4<x<1, and 0<y<1) layer formed on a conductive substrate; and b) applying an oxidation voltage to the electrode, and then applying a reduction voltage to the electrode, wherein, the oxidation voltage and the reduction voltage are applied in all direction along an entire outer circumference of the electrode.

According to another aspect of the present invention, there is provided an electrochromic device including a) a first electrode; b) a second electrode; c) an electrochromic material; and d) electrolyte, wherein the first electrode or the second electrode is prepared by the method of preparing an electrode.

Hereinafter, the present invention will be explained in more detail.

In a typical inorganic electrochromic device, coloring/decoloring reactions represented by Reaction Scheme 1 are repeatedly performed by using reductive metal oxide (that is, tungsten oxide) as a reductive electrode, and oxidative metal oxide (that is, lithium nickel oxide) as an oxidative electrode.

$WO_3$ (colorless)+$M^+$+$e^-$→$M_xWO_3$ (blue)

$LiNiO_2$ (brown)+$M^+$+$e^-$→$Li_2NiO_2$ (colorless)  [Reaction Scheme 1]

In the Reaction Scheme 1, M may be selected from the group including lithium, proton, potassium, etc., and lithium is particularly preferred.

In the case of a reductive tungsten oxide electrode, when a certain voltage is applied, the intercalation of metal ions and electrons into a tungsten oxide layer (a reduction reaction) turns the electrode into blue, and when a reverse voltage is applied, the deintercalation of metal ions and electrons from the tungsten oxide layer (an oxidation reaction) turns the electrode into colorless. On the other hand, in the case of an oxidative lithium nickel oxide electrode, when metal ions and electrons are intercalated, the electrode turns colorless, and when metal ions and electrons are deintercalated, the electrode is colored.

Especially, in the electrochromism of lithium nickel oxide, coloring/decoloring is dependent on oxidation state of Ni ions. In other words, in an oxidation state ($Ni^{3+}$), an electrode is colored, and in a reduction state ($Ni^{2+}$), an electrode turns colorless.

An electrode containing a lithium nickel oxide ($Li_xNi_{1-y}O$) layer, which is prepared by a conventional method (such as sputtering, a sol-gel method, pulsed-laser deposition) by using lithium nickel oxide ($Li_xNi_{1-y}O$) as an electrochromic material, is basically in a colored state, and has a structure including both $Ni^{2+}$ and $Ni^{3+}$. Therefore, in such an electrode, oxidation/reduction reactions as described above cannot be appropriately performed.

Especially, $Ni^{2+}$ is problematic in the structure including both $Ni^{2+}$ and $Ni^{3+}$, because $Ni^{2+}$ is positioned at a position of $Ni^{3+}$ and $Li^+$, and thus inhibits $Li^+$ from being intercalated into an electrode material from the outside.

Accordingly, when lithium nickel oxide ($Li_xNi_{1-y}O$) is forced to have a stoichiometric structure before the obtaining of an electrochromic device, lithium nickel oxide may not include both $Ni^{2+}$ and $Ni^{3+}$ and nickel has only a single oxidation number. An electrochromic device including such lithium nickel oxide can have the maximized optical and electrochromic properties through complete oxidation/reduction reactions.

For example, when all the $Ni^{2+}$ within lithium nickel oxide ($Li_xNi_{1-y}O$) are oxidized into $Ni^{3+}$, thereby forming a structure of $Li_{0.5}Ni_{0.5}O$, a colorless and transparent electrode of $Li_2NiO_2$ is obtained by intercalating $Li^+$. Specifically, such an electrode can be obtained by the steps of: applying an oxidation voltage to lithium nickel oxide ($Li_xNi_{1-y}O$) including both $Ni^{2+}$ and $Ni^{3+}$, thereby changing $Ni^{2+}$ to $Ni^{3+}$; and applying a reduction voltage to the lithium nickel oxide in the electrolyte containing $Li^+$, thereby intercalating $Li^+$ into the lithium nickel oxide. Such a process refers to 'formatting' in the present invention.

Conventionally, in order to solve the above described problems, after the obtaining of an electrochromic device by cohering an oxidative electrode with a reductive electrode, a process of repeatedly applying oxidation/reduction voltages (that is, a process of repeatedly coloring/decoloring the device) has been performed. However, in the case of a lithium nickel oxide ($Li_xNi_{1-y}O$) layer having a thickness of about 150 nm or more, there is a problem in that an electrochromic device is incompletely decolored even though oxidation/reduction voltages are repeatedly applied several hundred times. In addition, the application of oxidation/reduction voltages after the obtaining of an electrochromic device is not efficient, because there are limitations on processing conditions, such as a voltage range, due to the properties of the electrolyte within a device, or the device itself.

In the present invention, a formatting process is performed before an electrochromic device is obtained. In such a method, it is possible to variably change an applied voltage and processing conditions, etc., contrarily to repetition of application of oxidation/reduction voltages after the obtaining of an electrochromic device. Therefore, regardless of a thickness of an electrochromic material, nickel ions ($Ni^{2+}$ and $Ni^{3+}$) may be completely oxidized and reduced.

In other words, in the present invention, nickel within lithium nickel oxide has a single oxidation number by formatting an electrode including a lithium nickel oxide ($Li_xNi_{1-y}O$) layer. Therefore, even in the case of a lithium nickel oxide ($Li_xNi_{1-y}O$) layer having a thickness of about 150 nm or more, oxidation/reduction is completely performed, thereby achieving good electrochromic properties.

Figure 1:
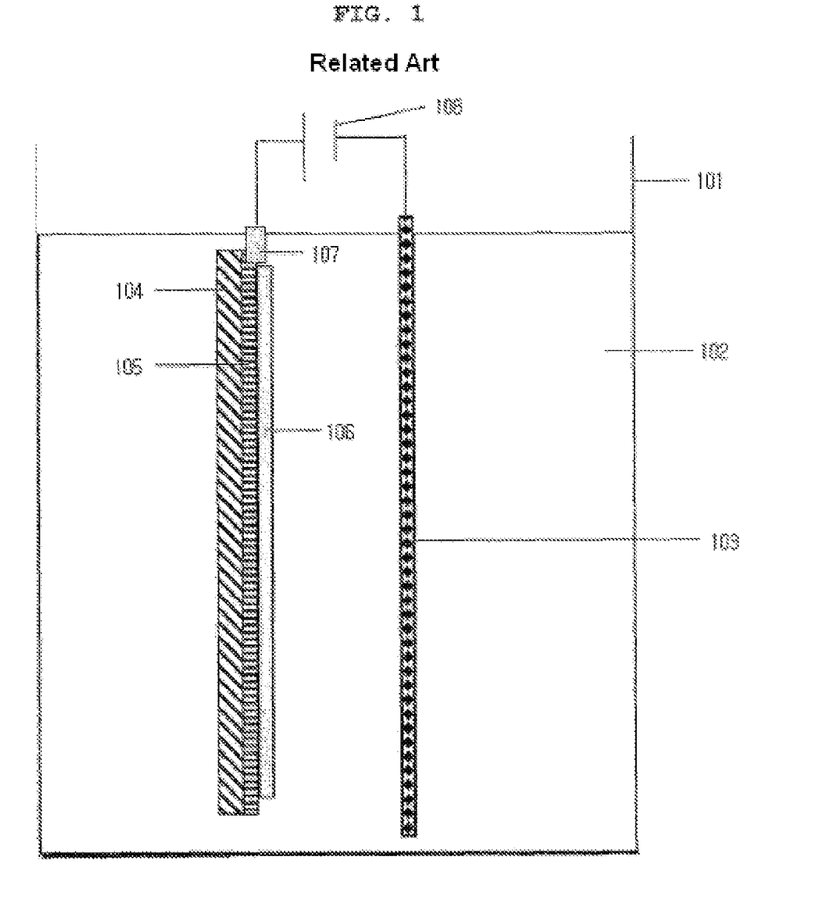
FIG. 1 illustrates a formatting process according to Comparative Example 1, in which a lithium nickel oxide electrode, of which one part is connected to a voltage applying means, and a counter electrode are perpendicularly disposed on a ground surface in an electrochemical cell.

FIG. 1 illustrates an electrode and a counter electrode 103 (Pt, Ir, Carbon, etc.) perpendicularly disposed on a ground surface in an electrochemical cell 101 including electrolyte 102, and a formatting process performed by applying a voltage to only one portion of the electrode. In the electrode, a glass substrate 104, an ITO film 105, and metal oxide 106 are sequentially multilayered. Herein, when a voltage is applied, an electrochemical reaction is performed by intercalation/deintercalation of lithium ions at the surface and the inside of a metal oxide layer on an ITO-coated glass substrate.

However, in the above described formatting process, there may be a difference in the rate of the formatting process, according to the thickness of lithium nickel oxide, the temperature of electrolyte, an applied voltage, and the way of applying a voltage to a transparent electrode. Accordingly, an electrode having uneven electrochromic properties or low durability may be obtained.

For example, in obtaining a lithium nickel oxide ($Li_xNi_{1-y}O$) electrode of a normal area (50×50 mm$^2$), even though a voltage is applied to only one portion of the electrode in a formatting process, there is little difference charge-transfer rates between a portion to which a voltage is directly applied and other portions to which a voltage is not directly applied, due to a small electrode area. Accordingly, since the entirety of the electrode is formatted at almost the same rate, regardless of a portion to which a voltage is applied or not, all nickel ions within the electrode has a single oxidation number at approximately the same time. Therefore, a lithium nickel oxide ($Li_xNi_{1-y}O$) electrode of a normal area, which is obtained by a formatting process, may be uniformly colored/decolored.

On the other hand, in obtaining a lithium nickel oxide ($Li_xNi_{1-y}O$) electrode of a wide area (100×100 mm$^2$), when a voltage is applied to only one portion of the electrode in a formatting process, there is a difference in charge-transfer rates between a portion to which a voltage is directly applied and other portions to which a voltage is not directly applied, due to a wide electrode area. Accordingly, since there is a difference in formatting process rates between a portion to which a voltage is directly applied and other portions to which a voltage is not applied, it is difficult that all nickel ions within the electrode has a single oxidation number at approximately the same time. Therefore, in an electrode obtained by a formatting process, electrochromism may be unevenly performed due to different transparencies of each portion during a reduction reaction.

Figure 2:
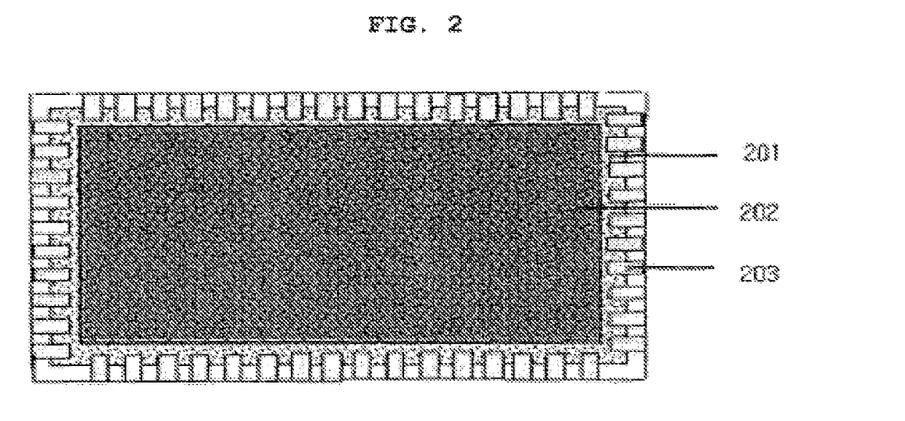
FIG. 2 illustrates clips disposed on the outer circumference of an electrode with a predetermined interval.
Figure 3:
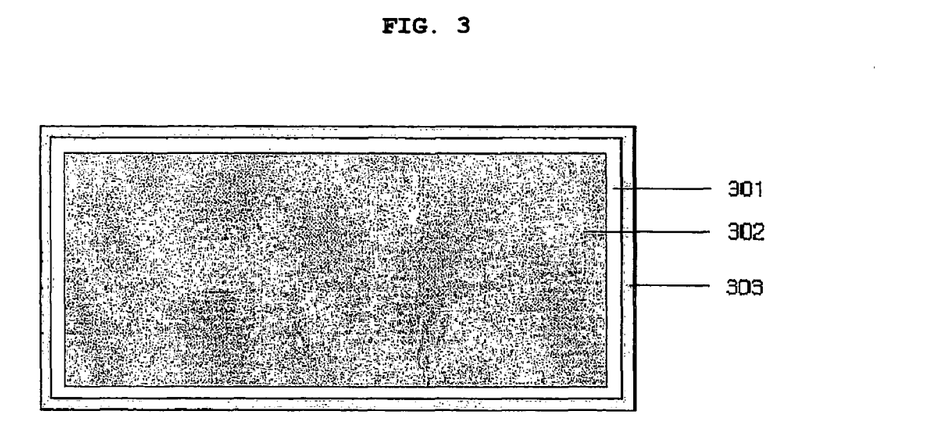
FIG. 3 illustrates a jig fixed on the entire outer circumference of an electrode.

In the present invention, in order to solve the above described problem in a format process of a wide area electrode, a voltage is applied in all directions along the circumference of a transparent electrode. For example, a voltage applying means capable of contacting with the entire outer circumference of an electrode (for example, a jig surrounding the outer circumference of an electrode, like a frame) may be in contact with the outer circumference of an electrode. (see, FIG. 3) Also, a conventional voltage applying means easily contacting with an electrode and having a small contacting area (such as an alligator clip) may be disposed on the outer circumference of an electrode with a predetermined interval, and may be in contact with an electrode. (see, FIG. 2) When oxidation/reduction voltages are applied in all directions along the circumference of an electrode in this manner, there is little difference in electron-transfer rates between a portion to which a voltage is directly applied and other portions to which a voltage is not directly applied, contrarily to the case where a voltage is applied to only one portion of an electrode. The formatting rate of all portions may be almost the same. Therefore, since the electrode obtained through the formatting process shows a high transparency of about 80~90% through reduction, and overall uniform transparency, it is possible to achieve excellent electrochromic properties. Such an effect according to the present invention is outstanding in a wide area electrode having an area of about 100×100~1000×1000 mm$^2$, and preferably an area of 100×100~240×360 mm$^2$.

Also, in a formatting process, the temperature of the electrolyte may be varied, as long as the electrolyte is not decomposed and stability of electrode is not affected. When the temperature of the electrolyte is increased, the rate of the formatting process may be high due to easy intercalation/deintercalation of lithium ions at an electrode layer. However, in the formatting process, when temperature of the entire electrolyte is not uniform and there is a difference in temperatures between the upper portion and the lower portion within the electrolyte, there may be a difference in moving rates of lithium ions between the upper portion and the lower portion within the electrolyte. Herein, when a working electrode and a counter electrode are perpendicularly disposed above a ground surface in an electrochemical cell including electrolyte, there is a difference in rates of the formatting process between the upper portion and the lower portion of an electrode, due to a difference in rates of intercalated/deintercalated lithium ions at the upper portion and the lower portion. Therefore, after the formatting process, the electrode may show uneven electrochromic properties. In the present invention, since a working electrode and a counter electrode are disposed horizontally above a ground surface in an electrochemical cell, it is possible to reduce the difference in temperatures between the upper portion and the lower portion of electrolyte, thereby improving electrochromic properties.

In a formatting process in the present invention, a voltage is applied in all directions along the outer circumference of an electrode, and/or a lithium nickel oxide electrode and a counter electrode are disposed horizontally above a ground surface in an electrochemical cell including electrolyte. Therefore, the formatting process is uniformly performed on the entirety of the electrode, and thus it is possible to obtain an electrode having excellent electrochromic properties.

An electrode containing lithium nickel oxide, in which nickel has a single oxidation number, according to the present invention, can be prepared by the method comprising the steps of: a) preparing an electrode including a lithium nickel oxide ($Li_xNi_{1-y}O$, herein, $0.4<x<1$, and $0<y<1$) layer formed on a conductive substrate; and b) applying an oxidation voltage to the electrode, and then applying a reduction voltage to the electrode. Herein, in step b) the oxidation/reduction voltages are applied in all directions along the outer circumference of an electrode.

In step a), a conventional method known to one skilled in the art, such as sputtering, a sol-gel method, pulsed laser deposition, etc. may be used. The thickness of a lithium nickel oxide layer, which is formed on a conductive substrate by sputtering, etc., may be within the range of 150 nm~10 μm.

In step b), an electrode including a lithium nickel oxide ($Li_xNi_{1-y}O$) layer formed on a conductive substrate may be used as a working electrode, and an oxidation voltage and a reduction voltage may be alternately applied in an electrochemical cell including electrolyte having lithium ions ($Li^+$) and a reductive counter electrode. Herein, the applied voltage may be within the range where an electrode is not decomposed.

In the electrochemical process, the oxidation voltage refers to (+) voltage applied to an electrode including a lithium nickel oxide layer (that is, a working electrode), which oxidizes Ni, and the reduction voltage refers to (−) voltage applied to the working electrode, which reduces Ni.

In a formatting process, it is preferable that an oxidation voltage is within the range of 1~3.2V, and a reduction voltage is within the range of −1~−2.7V. The maximum of an applicable voltage varies according to the thickness of an electrode and the resistance value of a voltage applying means. In the oxidation of an electrode, when an applied voltage is 3.0V or more, the electrode may be quickly present in an oxidation state of $Ni^{3+}$. However, if the applied voltage is 3.2V or more, such an excessive voltage may cause a decomposition reaction of an electrode. In the same manner as the above oxidation voltage, the reduction applied voltage also varies according to the thickness of an electrode and the resistance value of a voltage applying means. When the applied reduction voltage is −2.7V or less, side reactions may occur in an electrode. In the oxidation/reduction, an applied voltage is related to the time of a formatting process. In other words, as a high voltage is applied, the formatting process may be completed within a short time. However, since side reactions may occur in an electrode material, the formatting process is required to be efficiently completed within a short time by applying a maximum voltage within the range where the occurrence of the decomposition of an electrode material and the side reactions is minimized. Accordingly, it is possible to efficiently perform the formatting process by performing oxidation/reduction reactions within the range of less than 10 times where the durability of an electrode is not influenced. After a device is obtained, an applied oxidation/reduction voltage is required to be more than a value where an electrochromic material may be color-changed, and is required to be within the range of an electrochemical window of electrolyte within the device. Also, the applied voltage has to have an appropriate value allowing the device to be durable through tens of thousands of repeated processes. In the case of a device operation, an operating voltage of 1.7 V or more facilitates the decomposition reaction of electrolyte, thereby causing bubbles. On the other hand, in the formatting process according to the present invention, oxidation/reduction reactions of lithium nickel oxide may be performed with a higher voltage than that of the device operation.

In step b), a voltage applying means capable of fixedly contacting with the entire outer circumference of an electrode may be in contact with the outer circumference of an electrode, or a conventional voltage applying means may be disposed on the outer circumference of an electrode with a predetermined interval, and may be in contact with an electrode. Herein, the contact ratio of the voltage applying means and the electrode is preferably about 70~100% in the circumference (ex. the length of one side) of the electrode.

The voltage applying means that may be used in the present invention is not particularly limited, as long as the voltage applying means includes a metal of no reactivity with electrolyte or is coated with such a metal. The voltage applying means includes or is coated with an inert metal such as Pt, Ir, Pd, Ta, or, an alloy of the materials.

The shape of the voltage applying means that includes or is coated with a metal of no reactivity with the electrolyte is not particularly limited, as long as the voltage applying means has a minimized electrode-contacting area so that the movement of lithium ions may not be inhibited. Non-limiting examples of the shape of the voltage applying means include a jig, an alligator clip, etc. surrounding the outer circumference of an electrode, like a frame.

Also, in step b), it is preferable that the voltage application is performed for a sufficient time, so that nickel within lithium nickel oxide can have a single oxidation number through oxidation/reduction reactions of a lithium nickel oxide electrode. Herein, whether the oxidation or the reduction is completely performed or not may be determined based on decoloring of an electrode at reduction. Also, whether the electrode is completely decolored or not at reduction may be determined by measuring light transmittance of the electrode. For example, at the wavelength of 500 nm, when an electrode has the light transmittance of 60% or more, and preferably has 80% or more, it is determined the reduction has been completely performed.

In general, when an electrochromic device is obtained by cohering electrodes, the light transmittance is lower than that of an electrode. Accordingly, although an electrode completely reduced by a formatting process according to the present invention has the light transmittance of 60% or more, and preferably has 80% or more, an electrochromic device obtained by using the electrode may have the light transmittance of 65% or more.

Herein, a voltage applying time for completely oxidizing or reducing an electrode varies according to the thickness of a lithium nickel oxide layer formed on the electrode, but is preferably within the range of 10 seconds~30 minutes. When the electrode is not completely decolored by the application of a reduction voltage after the first application of an oxidation voltage, a voltage may be repeatedly applied, for example twice or tree times, until the electrode is completely decolored. Then, when the electrode is completely decolored, it may be determined that nickel in lithium nickel oxide has a singe oxidation number.

The times of repeatedly applying the oxidation/reduction voltages may be within the range of 1~50, and preferably within the range of 1~10.

A counter electrode included in the electrochemical cell is preferably a reductive electrode, and may be an amphoteric electrode. Non-limiting examples of the counter electrode included in the electrochemical cell includes platinum (Pt), tungsten oxide ($WO_3$), lithium foil, tin oxide, etc.

The electrolyte included in the electrochemical cell is required to have lithium ions ($Li^+$). Non-limiting examples of a source of lithium ions include $LiClO_4$, $LiPF_6$, LiTFSI, LiI, $LiBF_4$, etc., and non-limiting examples of an electrolyte solvent include propylene carbonate, acetonitrile, 7-butyrolatone, methoxypropionitrile, 3-ethoxypropionitrile, triethylene glycol dimethyl ether, etc. Also, another electrolyte including a mixed material may be used, the mixed material including two or more materials, and lowering a melting temperature. (for example, electrolyte including a eutectic mixture, in which a compound having two or more polar functional groups in a molecule, and lithium salt are included) Examples of electrolyte including the eutectic mixture include electrolyte including a eutectic mixture of methyl carbamate and $LiClO_4$.

As the temperature of the electrolyte in a formatting process is increased, the diffusion rate of lithium ions within the electrolyte is raised. Accordingly, it is possible to shorten the time for the formatting process by performing the formatting process at high temperatures (for example, at 15° C. or more) where electrochromic properties are not changed, and at temperatures lower than a boiling point or a decomposition point of the electrolyte. In the formatting process according to the present invention, the temperature of the electrolyte may be varied according to the kind of an electrolyte solvent, but is not particularly limited as long as the temperature is higher than 15° C. and lower than a boiling point or a decomposition point of the electrolyte. When propylene carbonate is used as the electrolyte, the temperature of the electrolyte for the formatting process may preferably be within the range of 15~120° C.

In an obtained device, there is a possibility that due to weak adhesive strength between a conductive substrate and a lithium nickel oxide ($Li_xNi_{1-y}O$) film, the film is stripped or bubbles occur within the electrolyte by repeatedly applying a voltage. This problem may be solved by inserting a heat-treatment process between steps a and b. It is preferable that the heat-treatment process is performed at 100~350° C. for 30 minutes~3 hours.

An electrochromic device according to the present invention includes a first electrode, a second electrode, an electrochromic material, and an electrolyte, and herein, the first electrode or the second electrode may be obtained by the above described processes.

Herein, either or both of the first electrode and the second electrode may include a transparent conductive film. Non-limiting examples of the material for the transparent conductive film include: metal films, such as Ag, Cr, etc.; and metal oxide, such as tin oxide, zinc oxide, ITO (indium tin oxide), FTO (fluorine doped tin oxide), IZO (indium zinc oxide), etc.; and a mixture thereof. The method of forming the transparent conductive film is not particularly limited, and can use a conventional method known to one skilled in the art, such as vacuum deposition, ion plating, electron-beam vacuum deposition, sputtering, etc.

The electrolyte included in the electrochromic device is not particularly limited as long as the electrolyte is known to one skilled in the art. Non-limiting examples of the electrolyte include the electrolyte included in the above described electrochemical cell, and besides, solid electrolyte such as Poly-AMPS, Poly(VAP), Modified PEO/LiCF$_3$SO$_3$, etc.

The electrochromic device according to the present invention may be obtained by a conventional method known to one skilled in the art. For example, a first electrode and a second electrode, except for an opening for electrolyte injection, are adhered to each other with an adhering agent including a spacer, and then the electrolyte is injected into the opening, followed by sealing.

The electrochromic device obtained as described above may be applied to various industrial fields requiring various electrochemical properties. The electrochromic device may be applied to a car mirror, a smart window, a sunroof, a display device, etc.

BEST MODE FOR CARRYING OUT THE INVENTION

Reference will now be made in detail to the preferred embodiments of the present invention. However, the following examples are illustrative only, and the scope of the present invention is not limited thereto.

EXAMPLE 1

Figure 4:
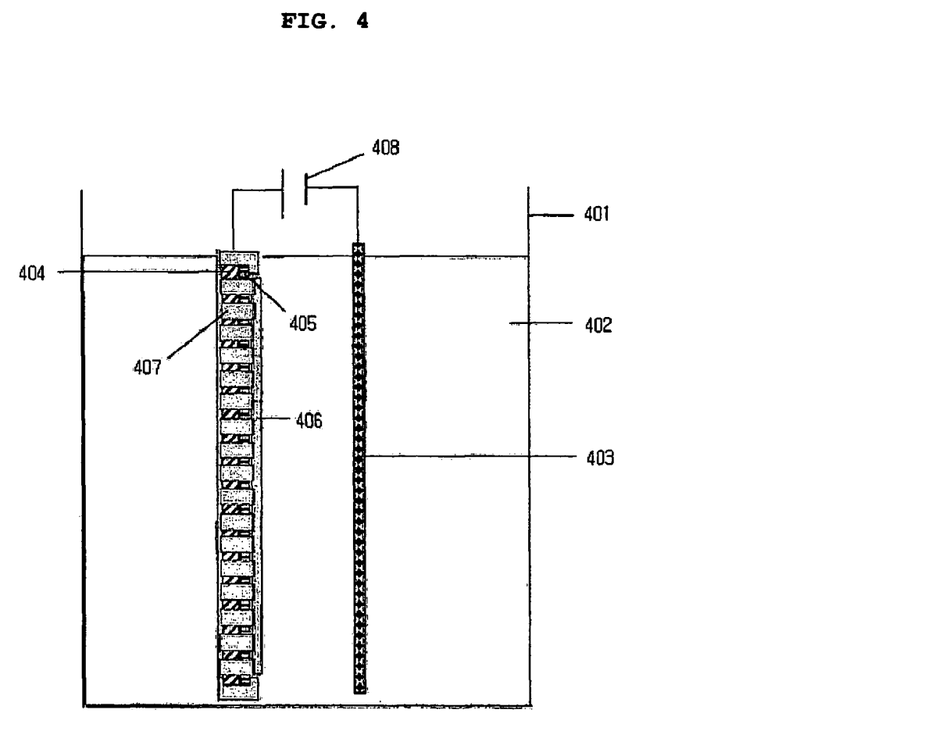
FIG. 4 illustrates a formatting process according to Example 1, in which a lithium nickel oxide electrode (of which the outer circumference is connected to clips with a predetermined interval) and a counter electrode are perpendicularly disposed on a ground surface in an electrochemical cell.

A lithium nickel oxide (Li$_x$Ni$_{1-y}$O) thin film having a thickness of about 150 nm was deposited on a glass substrate (100×100 mm$^2$) including an ITO transparent thin film, by using LiNiO$_2$ target through a sputtering method. To the outer circumference of the lithium nickel oxide electrode, multiple Ir-coated clips were disposed at an interval of about 20 mm. (See, FIG. 4) Electrolyte including a eutectic mixture of methyl carbamate and LiClO$_4$ was added in an electrochemical cell at 70 □, and an iridium (Ir) counter electrode and the lithium nickel oxide electrode were perpendicularly disposed in the electrochemical cell. Then, a formatting process was performed by repeatedly applying an oxidation voltage (+2.0V)/a reduction voltage (−1.8V) 3~5 times. Next, the deposited lithium nickel oxide (Li$_x$Ni$_{1-y}$O) having a thickness of about 150 nm was completely oxidized, and a reduction voltage was applied to obtain a colorless transparent lithium nickel oxide thin film.

Figure 6:
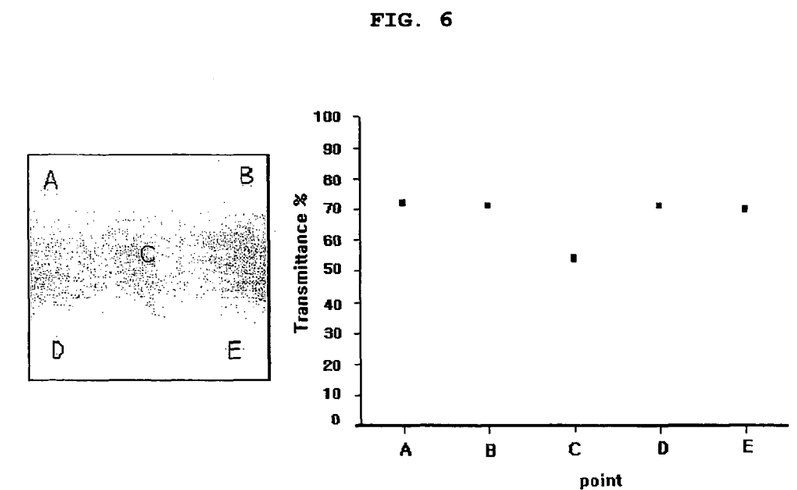
FIG. 6 is a graph illustrating the light transmittance of a lithium nickel oxide electrode formatted according to Example 1.

After the formatted lithium nickel oxide electrode was decolored, light with a wavelength of 550 nm was used to measure the light transmittance on every portion of the electrode. According to the measured results, except for a portion C showing light transmittance of 54%, other portions A, B, D, and E showed light transmittance of about 69~71%, and were almost transparent. (see, FIG. 6) On the other hand, in the portion C on the central portion of the electrode, a non-uniform zone(or line) appeared. It is determined that such a non-uniform zone was caused by a difference in the rates of the formatting process, due to a difference in moving rates of electrons by the difference in temperatures of electrolyte used for the formatting process.

EXAMPLE 2

Figure 5:
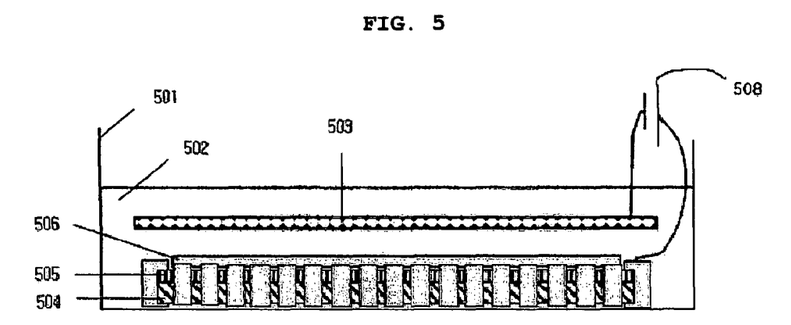
FIG. 5 illustrates a formatting process according to Example 2, in which a lithium nickel oxide electrode (of which the outer circumference is connected to clips with a predetermined interval) and a counter electrode are horizontally disposed above a ground surface in an electrochemical cell.

A formatting process was performed in the same manner as described in Example 1, except that an iridium (Ir) counter electrode and a lithium nickel oxide electrode were horizontally disposed in an electrochemical cell including electrolyte having a eutectic mixture. (See, FIG. 5)

Figure 7:
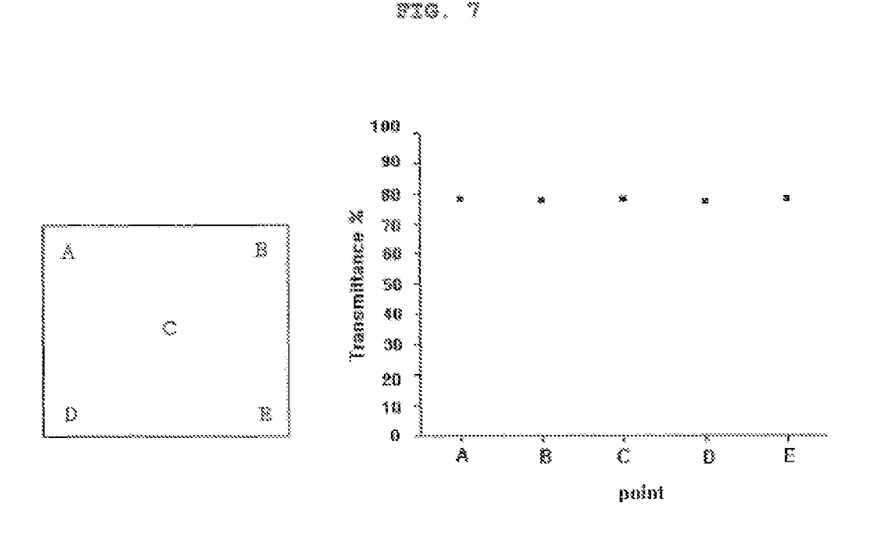
FIG. 7 is a graph illustrating the light transmittance of a lithium nickel oxide electrode formatted according to Example 2.

After the formatted lithium nickel oxide electrode was decolored, light with a wavelength of 550 nm was used to measure the light transmittance on every portion of the electrode. According to the measured results, every portion of the electrode showed light transmittance of about 78%, and was almost transparent. Also, electrochromism was uniformly performed at every portion of the electrode. (see, FIG. 7)

COMPARATIVE EXAMPLE 1

A formatting process was performed in the same manner as described in Example 1, except that oxidation/reduction voltages were applied by disposing one clip to one side of a lithium nickel oxide (Li$_x$Ni$_{1-y}$O) electrode. (see, FIG. 1)

Figure 8:
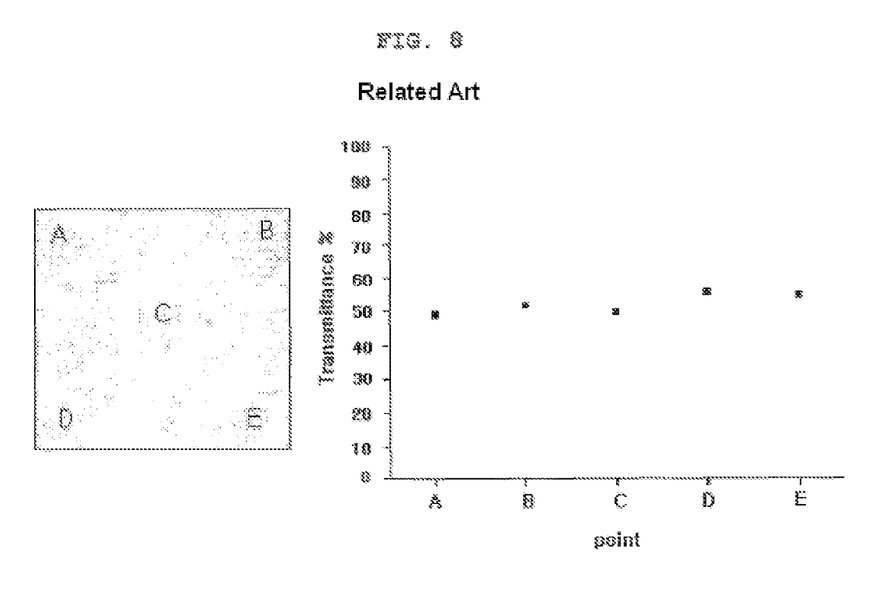
FIG. 8 is a graph illustrating the light transmittance of a lithium nickel oxide electrode formatted according to Comparative Example 1.

Light with a wavelength of 550 nm was used to measure the light transmittance on every portion of the formatted lithium nickel oxide electrode. According to the measured results, every portion of the electrode showed low light transmittance of about 49~55%, and was not transparent. Also, electrochromism was non-uniformly performed at every portion of the electrode. (see, FIG. 8)

INDUSTRIAL APPLICABILITY

As can be seen from the foregoing, in the present invention, in a formatting process for a lithium nickel oxide electrode, oxidation/reduction voltages are applied in all directions along the outer circumference of an electrode, and/or electrodes are horizontally disposed above a ground surface in electrolyte. Therefore, the formatting process may be uniformly performed on the outer circumference of an electrode, thereby improving electrochromic properties of the electrode.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

The invention claimed is:

1. A method of preparing an electrode containing lithium nickel oxide, in which nickel has a single oxidation number, the method comprising the steps of:
   a) preparing an electrode comprising a lithium nickel oxide ($Li_xNi_{1-y}O$, herein, $0.4<x<1$, and $0<y<1$) layer formed on a conductive substrate; and
   b) applying an oxidation voltage to the electrode, and then applying a reduction voltage to the electrode, wherein the oxidation voltage and the reduction voltage are applied to the electrode by using a voltage applying means, which can contact with an entire outer circumference of the electrode, is disposed on the entire outer circumference of the electrode, and contacts with the electrode; or by using a voltage applying means which is disposed on the outer circumference of the electrode with a predetermined interval and contacts with the electrode, and
   the lithium nickel oxide is represented by following Formula 1:

$Li_xNi_{1-y}O$ wherein $0.4<x<1$ and $0<y<1$. [Formula 1]

2. The method as claimed in claim 1, wherein the oxidation voltage and the reduction voltage are applied to an entire outer circumference of the electrode.

3. The method as claimed in claim 1, wherein the oxidation voltage and the reduction voltage are applied by horizontally disposing the electrode comprising the lithium nickel oxide layer and a reductive counter electrode above a ground surface in an electrochemical cell comprising an electrolyte.

4. The method as claimed in claim 1, wherein in step b), the oxidation voltage and the reduction voltage are alternately applied in an electrochemical cell comprising an electrolyte having lithium ions ($Li^+$) and a reductive counter electrode.

5. The method as claimed in claim 1, wherein a contact ratio of the voltage applying means and the electrode is 70~100% in the outer circumference of the electrode.

6. The method as claimed in claim 1, wherein the voltage applying means comprises a metal of no reactivity with an electrolyte or is coated with a metal of no reactivity with an electrolyte.

7. The method as claimed in claim 1, wherein the voltage applying means comprises or is coated with one or more metal selected from the group including Pt, Ir, Pd, and Ta, or an alloy of the materials.

8. The method as claimed in claim 1, wherein in step b), the applied oxidation voltage is within a range of 1~3.2V, and the applied reduction voltage is within a range of −1~−2.7V.

9. The method as claimed in claim 1, wherein in step b), the oxidation and the reduction voltage are applied until the electrode is completely oxidized or reduced.

10. The method as claimed in claim 1, wherein in step b), at application of the reduction voltage, the electrode is completely reduced so that light transmittance is 60% or more at a wavelength of 500 nm.

11. The method as claimed in claim 1, wherein in step b), temperature is higher than 15° C. and lower than a boiling point or a decomposition point of an electrolyte.

12. The method as claimed in claim 1, wherein in step b), the oxidation voltage and the reduction voltage are repeatedly applied 1~10 times.

13. The method as claimed in claim 1 further comprises the step of heat-treating the electrode comprising the lithium nickel oxide layer, between the steps a) and b).

14. The method as claimed in claim 13, wherein the step of heat-treating is performed at 100~350° C. for 30 minutes ~3 hours.

15. The method as claimed in claim 1, wherein a thickness of the lithium nickel oxide layer formed on the conductive substrate is 150 nm~10 μm.

16. An electrode comprising a lithium nickel oxide layer formed on a conductive substrate, and Ni having a single oxidation number in lithium nickel oxide, which is prepared by the method as claimed in claim 1.

17. The electrode as claimed in claim 16, wherein the oxidation number is +2 or +3.

18. An electrochromic device comprising
   a) a first electrode;
   b) a second electrode;
   c) an electrochromic material; and
   d) an electrolyte,
   wherein, the first electrode or the second electrode is the electrode as claimed in claim 16.

19. The method as claimed in claim 1, wherein the voltage applying means comprises a metal of no reactivity with an electrolyte or is coated with a metal of no reactivity with an electrolyte.

20. The method as claimed in claim 1, wherein the voltage applying means comprises or is coated with one or more metal selected from the group including Pt, Ir, Pd, and Ta, or an alloy of the materials.

21. The method as claimed in claim 1, wherein the oxidation voltage and the reduction voltage are uniformly applied to the entire outer circumference of the electrode with a predetermined interval.

* * * * *